US006756083B2

(12) United States Patent
Holmqvist et al.

(10) Patent No.: US 6,756,083 B2
(45) Date of Patent: Jun. 29, 2004

(54) METHOD OF COATING SUBSTRATE WITH THERMAL SPRAYED METAL POWDER

(75) Inventors: Ulf Holmqvist, Bethlehem, PA (US); Hans Hallén, Waterloo (BE)

(73) Assignee: Höganäs AB, Höganäs (SE)

( * ) Notice: Subject to any disclaimer, the term of this patent is extended or adjusted under 35 U.S.C. 154(b) by 0 days.

(21) Appl. No.: 10/270,728

(22) Filed: Oct. 16, 2002

(65) Prior Publication Data

US 2003/0068515 A1 Apr. 10, 2003

Related U.S. Application Data

(63) Continuation-in-part of application No. 09/900,982, filed on Jul. 10, 2001, now abandoned, which is a continuation-in-part of application No. PCT/SE02/00943, filed on May 17, 2002.

(30) Foreign Application Priority Data

May 18, 2001 (SE) .............................. 0101776

(51) Int. Cl.[7] .......................... C23C 4/06; B23K 9/04; B23K 10/02
(52) U.S. Cl. .................. 427/456; 219/76.1; 219/76.16; 219/121.46; 219/121.47; 219/146.32
(58) Field of Search .......................... 219/76.11, 76.16, 219/121.46, 121.47, 146.31, 146.32, 76.1; 427/456

(56) References Cited

U.S. PATENT DOCUMENTS

| 2,588,422 | A | | 3/1952 | Shepard | |
|---|---|---|---|---|---|
| 3,991,240 | A | * | 11/1976 | Harrington et al. | ......... 427/446 |
| 4,561,892 | A | | 12/1985 | Kumar et al. | |
| 4,954,171 | A | | 9/1990 | Takajo et al. | |
| 4,985,309 | A | | 1/1991 | Ogura et al. | |
| 5,240,742 | A | | 8/1993 | Johnson et al. | |
| 5,334,235 | A | | 8/1994 | Dorfman et al. | |
| 5,571,305 | A | | 11/1996 | Uenosono et al. | |
| 5,643,531 | A | * | 7/1997 | Kim et al. | ..................... 420/64 |
| 5,863,870 | A | * | 1/1999 | Rao et al. | ................... 508/150 |
| 6,068,813 | A | | 5/2000 | Semel | |
| 6,095,107 | A | | 8/2000 | Kloft et al. | |
| 6,548,195 | B1 | * | 4/2003 | Barbezat | ..................... 428/701 |
| 2001/0015290 | A1 | * | 8/2001 | Sue et al. | ................... 175/374 |

FOREIGN PATENT DOCUMENTS

| JP | 53-041621 | * | 4/1978 |
|---|---|---|---|
| JP | 56-156751 | * | 12/1981 |
| JP | 3-264642 | | 2/1982 |
| JP | 63137102 | | 6/1988 |
| JP | 63140002 | | 6/1988 |
| JP | 2145703 | | 6/1990 |
| JP | 633101 | | 2/1994 |
| JP | 06-033101 | * | 2/1994 |
| JP | 7331395 | | 12/1995 |
| JP | 07-331395 | * | 12/1995 |
| JP | 849047 | | 2/1996 |
| JP | 8-209202 | | 8/1996 |
| WO | WO 01/32946 A1 | | 5/2001 |

OTHER PUBLICATIONS

PCT International–Type Search Report issued in Swedish Patent Application No. 0101776–3, Nov. 28, 2001.

* cited by examiner

Primary Examiner—Katherine A. Bareford
(74) Attorney, Agent, or Firm—Burns, Doane, Swecker & Mathis, L.L.P.

(57) ABSTRACT

Methods for applying thermal coatings on substrates using a diffusion alloyed metal powder are provided. The powder comprises pre-alloyed iron base powder particles having molybdenum particles diffusion alloyed to the base powder particles.

33 Claims, 4 Drawing Sheets

METHOD OF COATING SUBSTRATE WITH THERMAL SPRAYED METAL POWDER

CROSS-REFERENCE TO RELATED APPLICATIONS

This application is a Continuation-in-part of application Ser. No. 09/900,982, filed on Jul. 10, 2001 now abandoned; a Continuation-in-Part of International Application No. PCT/SE02/00943, which designates the United States of America and was filed on May 17, 2002; and claims priority to Swedish Application No. 0101776-3, filed on May 18, 2001, the entire disclosures of which are hereby incorporated by reference.

FIELD OF THE INVENTION

The present invention concerns thermal spray powders, their production and use. Specifically, the invention concerns coating of aluminum substrates with thermally sprayed metal powders.

BACKGROUND OF THE INVENTION

Different methods for producing coatings on aluminum substrates are previously known. These methods are used in, e.g., aluminum engine blocks having cylinder liners which are formed by thermal spraying.

U.S. Pat. No. 2,588,422 discloses an aluminum engine block having cylinder liners which are formed by thermal spraying. These liners are built up in two layers on the untreated surface of the engine block, the top layer being a hard slide layer such as steel about 1 mm in thickness and the lower layer being a molybdous interlayer about 50 microns in thickness. The interlayer, containing at least 60% molybdenum, does not constitute a slide layer, but is necessary in order to bind the hard slide layer to the aluminum block. Preferably, the interlayer is made up of pure molybdenum. The slide layer is a layer of hard metal, as for example carbon steel, bronze or stainless steel, in which the steel may be an alloy containing nickel, chromium, vanadium or molybdenum, for example. In principle, this two-layer structure provides a good slide layer, but the cost of the double coating is substantial.

In recent thermal spraying methods, the thermal spray powders are made up by a mixture of powdered steel with powdered molybdenum, such as described in the U.S. Pat. No. 6,095,107. The risk of segregation due to differences in properties between the base steel powder and the powder of crushed molybdenum is however a problem which may result in non-uniform coatings. Another disadvantage is that comparatively large amounts of molybdenum are required due to the segregation effect.

A main object of the present invention is to provide an inexpensive metal powder for thermal coating of substrates, especially for aluminum.

Another object is to provide a powder, which does not segregate and wherein the amount of expensive molybdenum alloying metal can be reduced in comparison with currently used methods.

A further object is to provide a thermal powder, which has high deposition efficiency and gives excellent coating quality.

Another object is to provide a thermal powder giving coatings of suitable porosity and oxide content and wherein the pores are predominantly closed, isolated and have an advantageous range of pore diameters.

SUMMARY OF THE INVENTION

These objects are obtained by a metal powder comprising a pre-alloyed iron base powder having particles of molybdenum, such as reduced molybdenum trioxide, diffusion alloyed to the particles of the base powder.

DETAILED DESCRIPTION OF THE INVENTION

Figure 1:
FIG. 1 is a micrograph of a metal powder in which molybdenum is diffusion alloyed to the surface of base powder particles.

The type and particle size of the iron base powder is selected in view of the desired properties of the final coating and the substrate. The base powders are preferably pre-alloyed with elements desired in the coating. Also, a minor part of the molybdenum content may be included in the pre-alloyed powder. Other elements, which may be included in the pre-alloyed base powder are C, Si, Mn, Cr, V and W. In the following, all % are in weight unless otherwise indicated. The pre-alloyed powder may be prepared by atomization water or gas. The particle sizes of the base powder are below 500 $\mu$m preferably between 25 and 210 $\mu$m for PTA and less than 90 $\mu$m, preferably less than 65 $\mu$m, for high-velocity oxygen fuel (HVOF) or plasma spraying.

According to the present invention the base powder and the alloying powder, i.e., the source of the alloying element, which is preferably molybdenum trioxide, are mixed according to the prescribed formulation and the mixture is heated to a temperature below the melting point of the obtained mixture. The temperature should be sufficiently high to ensure adequate diffusion of the alloying element into the iron base powder in order to form a partially or diffusion alloyed powder. On the other hand, the temperature should be lower than the temperature required for complete pre-alloying. Usually the temperature is between 700° and 1000° C., preferably between 750° and 900° C., and the reduction is performed in a reducing atmosphere, e.g., hydrogen, for a period of 30 minutes to 2 hours for reduction of the molybdenum trioxide, which is a preferred molybdenum source. As an alternative molybdenum source, metallic molybdenum may be used.

Metal powders having molybdenum diffusion alloyed to base powder particles are known. See, e.g., Japanese Patent Publication Nos. 8-209 202, 63-137102 and 3-264 642. These known powders are, however, used within the powder metallurgical industry for producing sintered products of various shapes and sizes. Furthermore, and in contrast to the powders according to the present invention, these known powders often have not only molybdenum, but also copper and/or nickel diffusion alloyed to the base powder particles. In these known powders the content of the diffusion alloyed molybdenum is usually low, whereas in the inventive powder for thermal coating, the diffusion alloyed molybdenum is preferably high in order to obtain efficient sliding. The most interesting results that have been obtained are with powders having a content of diffusion alloyed molybdenum above about 4% by weight. Furthermore, only molybdenum is diffusion alloyed to the base powder particles in the powder used for thermal spraying according to the present invention. The upper limit of this diffusion alloyed molybdenum is decided by how much molybdenum the base particles can carry, which appears to be about 15% by weight, as described below.

The particle size of the final thermal sprayed powder is essentially the same as that of the pre-alloyed base powder, as the molybdenum particles, which are obtained when the molybdenum trioxide is reduced, are very small in comparison with the particles of the base powder. The amount of the Mo that is diffusion alloyed to the base powder should be at least 2% by weight of the total powder composition. Preferably, the amount of Mo should be between 2 and 15, and most preferably between 3 and 10% by weight.

The different methods for applying the diffusion alloyed powders on the metal base substrate are spray or weld cladding processes, such as flame spray, HVOF and plasma spray or PTA.

The invention is further illustrated by, but should not be limited to, the following preparation and example.

EXAMPLE

For the experiment on the new material for thermal coating based on water atomized Fe-based (Fe-3Cr-0.5Mo)+ 5% Mo.

Used base materials and chemical analysis:
Water atomized iron powder (Fe-3Cr-0.5Mo)-71 μm
Molybdenum trioxide MoO$_3$ (average particle size 3–7 μm)

| Chemical Analysis (Fe-3Cr-0.5 Mo) | |
|---|---|
| | % |
| O-tot | 1.22 |
| C | 0.48 |
| Fe | Base |
| Ni | 0.05 |
| Mo | 0.52 |
| Mn | 0.10 |
| S | 0.01 |
| P | 0.01 |
| Cr | 2.95 |
| Si | <0.01 |

| Sieve Analysis (Fe-3Cr-0.5 Mo) | |
|---|---|
| μm | % |
| 71–106 | 0.1 |
| 63–71 | 0.8 |
| 53–63 | 4.7 |
| 45–53 | 23.4 |
| 36–45 | 23.1 |
| 20–36 | 33.3 |
| −20 | 14.6 |

Procedure 92.46% of the water atomized (Fe-3Cr-0.5Mo powder) and 7.54% of MoO$_3$ were mixed together in a Lödige mixer and the annealing was carried out as follows:

Temperature: 820° C.
Time: 60 min
Atmosphere: Reducing atmosphere (type H$_2$, N$_2$, CO$_2$ and mixtures of these gases)

After annealing the powder cake was crushed and sieved to a particle size below 75 μm.

Sieve analysis and chemical composition (powder mix after annealing):

| Chemical Analysis (Fe-3Cr-0.5 Mo) | |
|---|---|
| | % |
| O-tot | 1.5 |
| C | 0.60 |
| Fe | Base |
| Ni | 0.05 |
| Mo | 5.57 |
| Mn | 0.10 |
| S | 0.01 |
| P | 0.01 |
| Cr | 2.75 |
| Si | <0.1 |

| Sieve Analysis (Fe-3Cr-0.5 Mo) | |
|---|---|
| μm | % |
| 71–106 | 0.1 |
| 63–71 | 1.4 |
| 53–63 | 6.5 |
| 45–53 | 34.1 |
| 36–45 | 20.4 |
| 20–36 | 30.8 |
| −20 | 6.7 |

Figure 2:
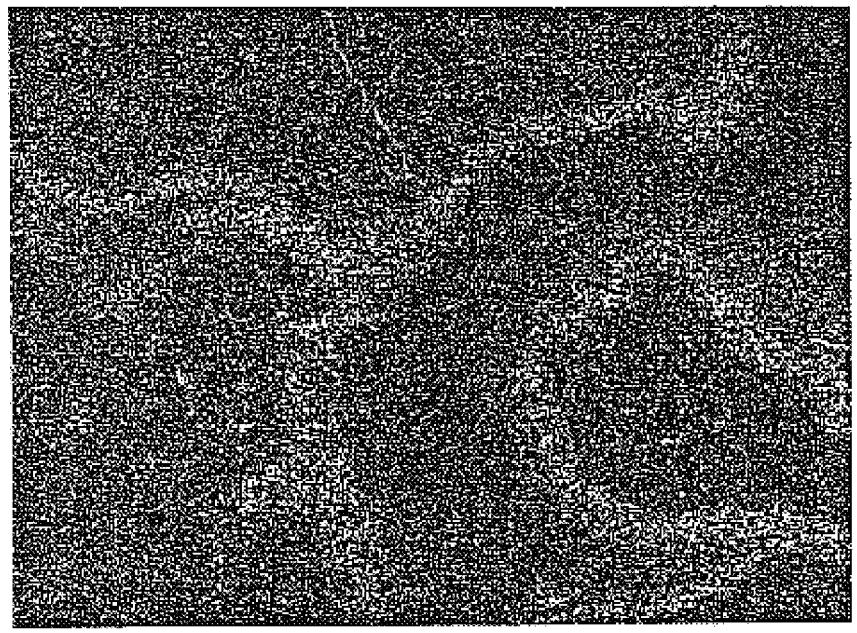
FIG. 2 is a map showing the distribution of molybdenum in the metal powder shown in FIG. 1.
Figure 3:
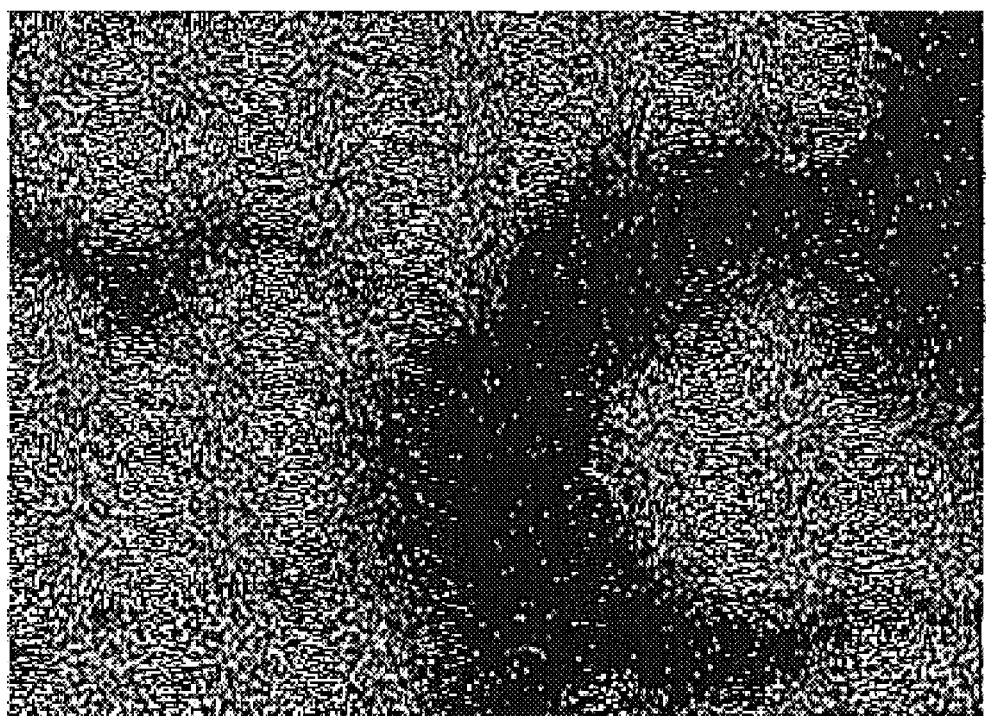
FIG. 3 is a map showing the distribution of iron in the metal powder shown in FIG. 1.
Figure 4:
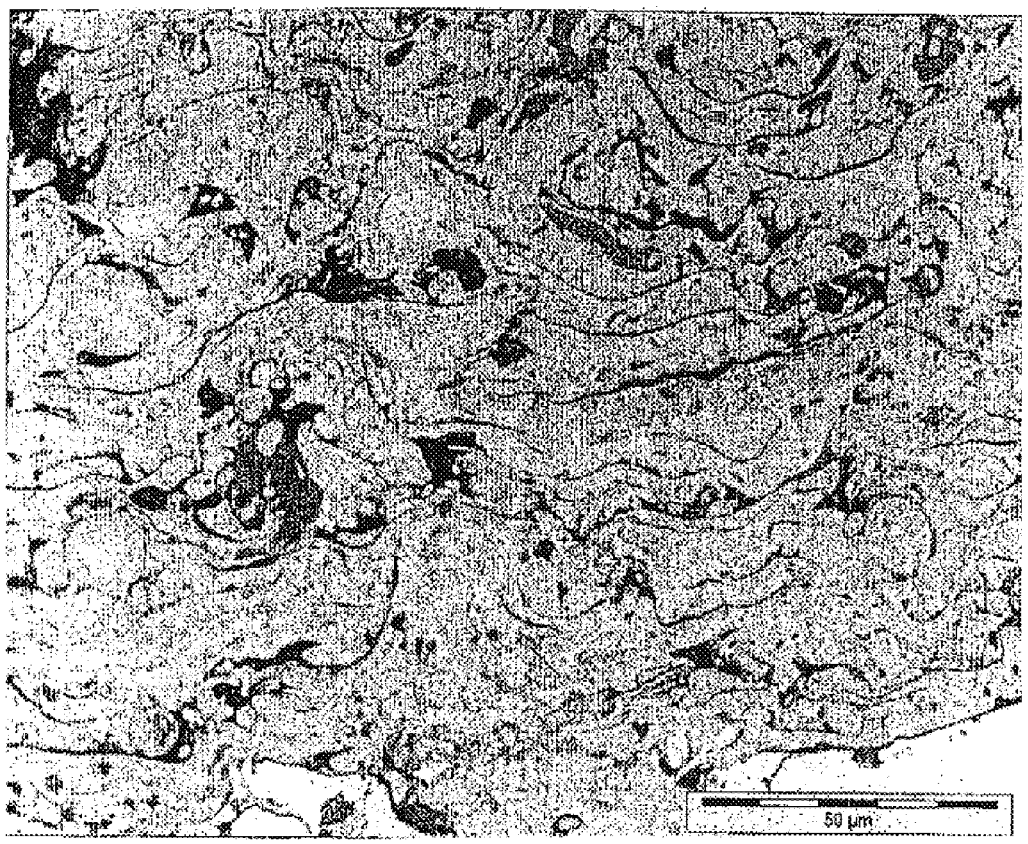
FIG. 4 is a micrograph of a coating formed by applying the metal powder shown in FIG. 1 on an aluminum substrate by plasma spraying.

The obtained powder was used in a plasma spraying process for coating an Al base substrate. An unexpectedly homogenous and excellent coating was obtained with a minimum amount of Mo. FIG. 1 is a micrograph of the powder showing molybdenum diffusion alloyed to the surface of the base powder particles. FIG. 2 is a map showing the distribution of molybdenum (in light spots) in the metal powder shown in FIG. 1. FIG. 3 is a map showing the distribution of iron in the metal powder shown in FIG. 1. FIG. 4 shows the plasma sprayed coating applied on the Al base substrate.

While the invention has been described in detail with reference to preferred embodiments thereof, it will be apparent to those skilled in the art that various changes and modifications can be made, and equivalents employed, without departing from the scope of the appended claims.

What is claimed is:

1. A method of applying a coating on a substrate, comprising applying a metal powder consisting essentially of pre-alloyed iron base powder particles having molybdenum diffusion alloyed to the base powder particles on a substrate by a thermal spraying or weld cladding process, wherein only the metal powder is applied on the substrate by the thermal spraying or weld cladding process.

2. The method according to claim 1, wherein only molybdenum is diffusion alloyed to the base powder particles and the amount of molybdenum diffusion alloyed to the base powder particles is from 2–15% by weight of the metal powder.

3. The method according to claim 1, wherein only molybdenum is diffusion alloyed to the base powder particles and the amount of molybdenum diffusion alloyed to the base powder particles is from 3–10% by weight of the metal powder.

4. The method according to claim 1, wherein the metal powder is applied on the substrate by a the plasma spraying process.

5. The method according to claim 1, wherein the metal powder is applied on the substrate by a the flame spraying process.

6. The method according to claim 1, wherein the metal powder is applied on the substrate by a high-velocity oxygen fuel process.

7. The method according to claim 1, wherein the substrate is aluminum.

8. The method according to claim 1, wherein the base powder is a gas-atomized powder.

9. The method according to claim 1, wherein the base powder is a water-atomized powder.

10. The method according to claim 1, wherein the metal powder comprises at least one element selected from the group consisting of carbon, silicon, manganese, chromium, molybdenum, vanadium and tungsten.

11. The method according to claim 1, wherein the metal powder comprises in weight %: 0.60 C, <0.1 Si, 0.10 Mn and 2.75 Cr.

12. The method according to claim 1, wherein the substrate is a cylinder liner of an aluminum engine block.

13. The method according to claim 1, further comprising making the metal powder by:

mixing the base powder particles with molybdenum-containing powder to form a mixture; and heating the mixture to a temperature sufficient to diffuse molybdenum into the base powder particles to form the metal powder consisting essentially of pre-alloyed iron base powder particles having only molybdenum diffusion alloyed to the base powder particles.

14. The method according to claim 13, wherein the molybdenum-containing powder is molybdenum trioxide and the base powder is Fe-3Cr-0.5Mo in % by weight.

15. The method according to claim 13, wherein the mixture is heated in a reducing atmosphere at a temperature between 750° C. and 900° C.

16. The method according to claim 1, wherein the metal powder has a particle size of less than 500 µm.

17. The method according to claim 1, wherein the metal powder has a particle size of 25–210 µm.

18. The method according to claim 1, wherein the metal powder has a particle size of less than 90 µm.

19. The method according to claim 1, wherein the coating contains pores which predominantly are closed.

20. A method of applying a coating on a substrate, comprising applying a metal powder consisting essentially of pre-alloyed iron base powder particles having only molybdenum diffusion alloyed to the base powder particles on an aluminum substrate by a plasma spraying process, the amount of molybdenum diffusion alloyed to the base powder particles being from 3–10% by weight of the metal powder, wherein only the metal powder is applied on the substrate by the plasma spraying process.

21. The method according to claim 20, wherein the metal powder comprises at least one element selected from the group consisting of carbon, silicon, manganese, chromium, molybdenum, vanadium and tungsten.

22. The method according to claim 20, wherein the metal powder has a particle size of less than 65 µm.

23. The method according to claim 20, wherein the coating contains pores which predominantly are closed.

24. The method according to claim 20, wherein the substrate is a cylinder liner of an aluminum engine block.

25. The method according to claim 20, further comprising making the metal powder by:

mixing the base powder particles with molybdenum-containing powder to form a mixture; and heating the mixture to a temperature sufficient to diffuse molybdenum into the base powder particles to form the metal powder consisting essentially of pre-alloyed iron base powder particles having only molybdenum diffusion alloyed to the base powder particles.

26. The method according to claim 25, wherein the molybdenum-containing powder is molybdenum trioxide and the iron base powder is Fe-3Cr-0.5Mo in % by weight.

27. The method according to claim 25, wherein the mixture is heated in a reducing atmosphere at a temperature between 750° C. and 900° C.

28. A method of applying a coating on a substrate, comprising applying a metal powder consisting essentially of pre-alloyed iron base powder particles having only molybdenum diffusion alloyed to the base powder particles on a substrate by a weld cladding process, the amount of molybdenum diffusion alloyed to the base powder particles being from 3–10% by weight of the metal powder, wherein only the metal powder is applied on the substrate by the weld cladding process.

29. The method according to claim 28, wherein the metal powder comprises carbon, silicon, manganese, chromium, molybdenum, vanadium and tungsten.

30. The method according to claim 28, wherein the substrate is a cylinder liner of an aluminum engine block.

31. The method according to claim 28, further comprising making the metal powder by:

mixing the base powder particles with molybdenum-containing powder to form a mixture; and heating the mixture to a temperature sufficient to diffuse molybdenum into the base powder particles to form the metal powder consisting essentially of pre-alloyed iron base powder particles having only molybdenum diffusion alloyed to the base powder particles.

32. The method according to claim 31, wherein the molybdenum-containing powder is molybdenum trioxide and the iron base powder is Fe-3Cr-0.5Mo in % by weight.

33. The method according to claim 31, wherein the mixture is heated in a reducing atmosphere at a temperature between 750° C. and 900° C.

* * * * *